Figure 1:
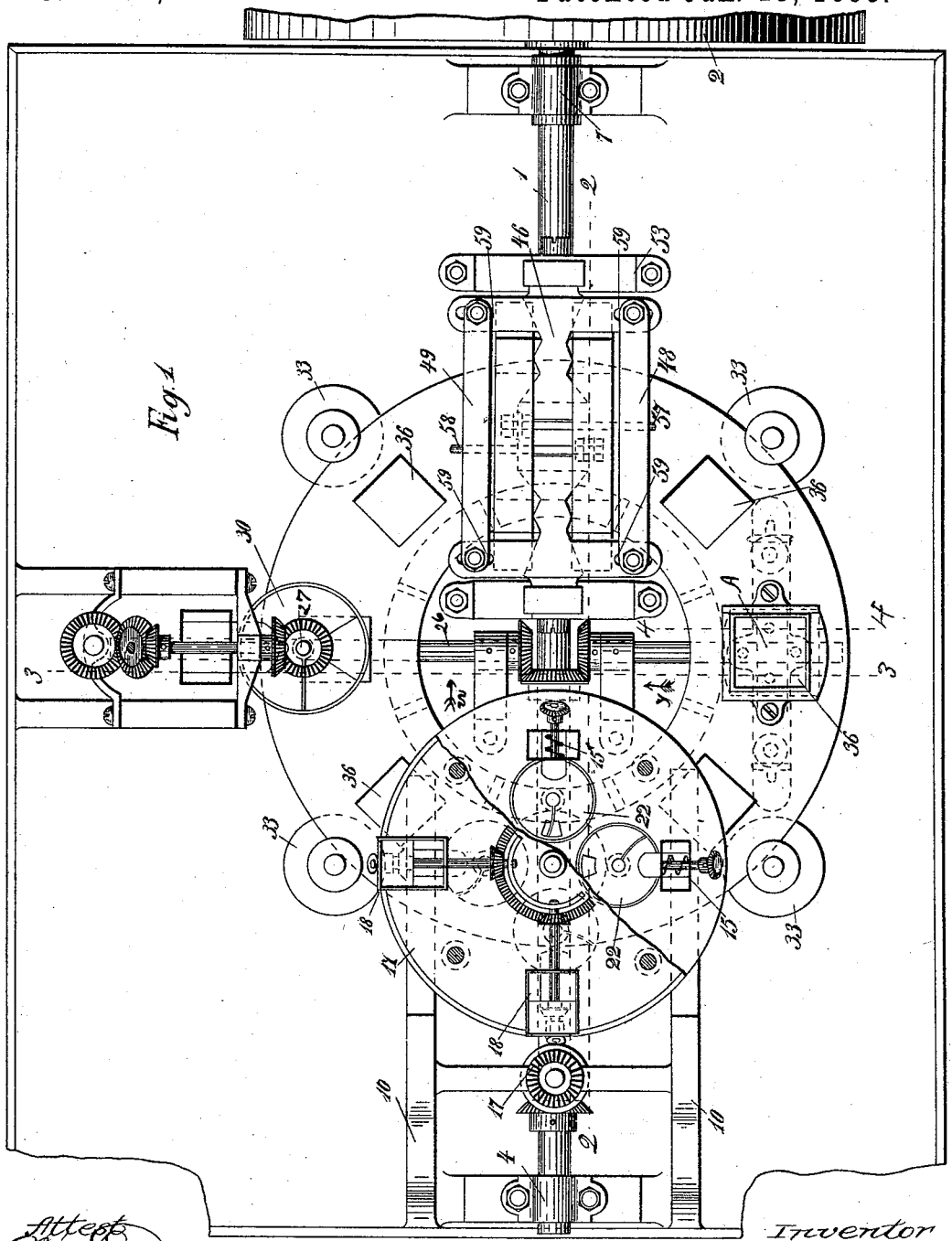

(Specimens.)

6 Sheets—Sheet 1.

K. THOMANN.
MACHINE FOR MOLDING AND PRESSING TILES.

No. 532,500. Patented Jan. 15, 1895.

Inventor
Karl Thomann
by Ellis Spear
Atty.

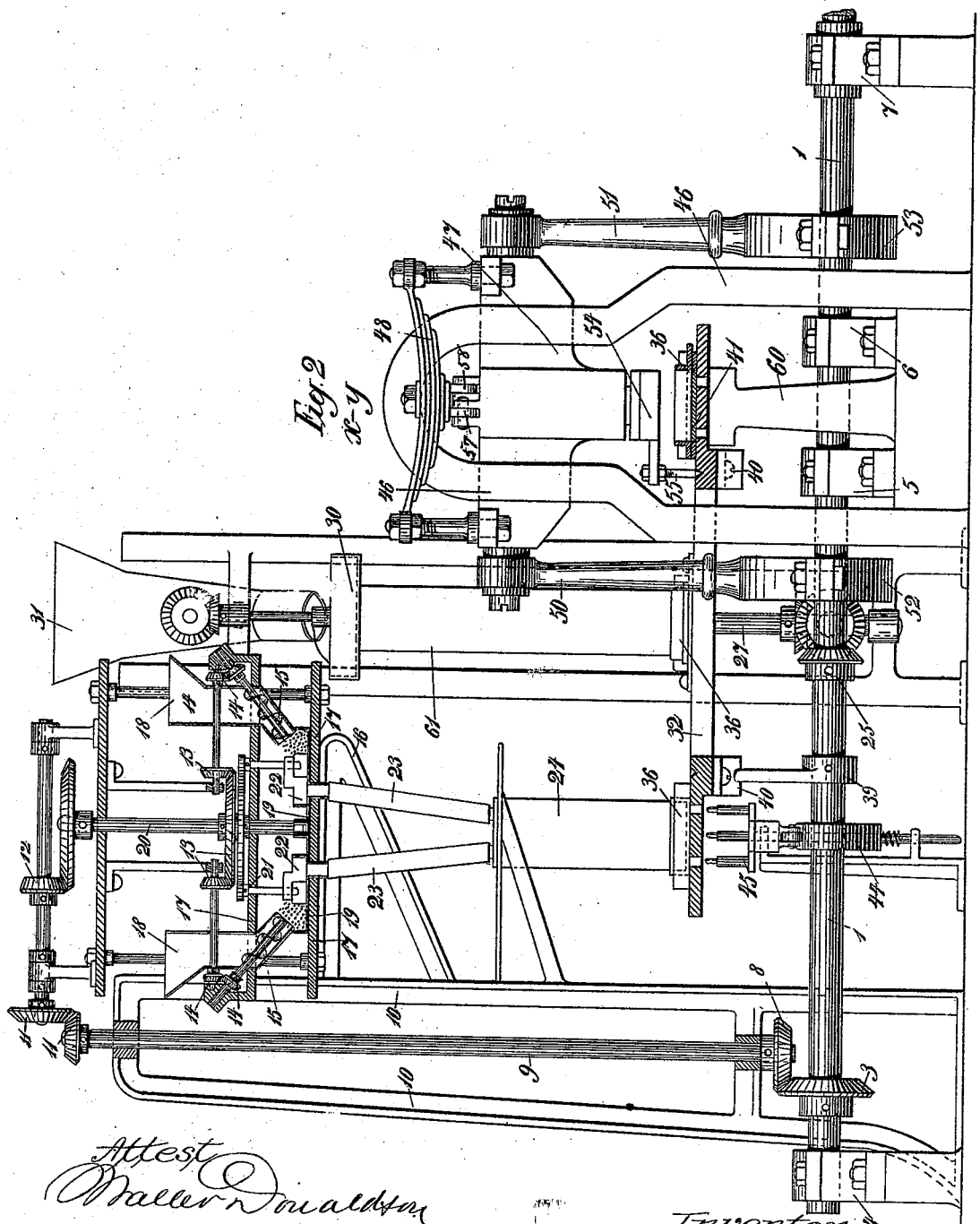

(Specimens.)
6 Sheets—Sheet 3.
K. THOMANN.
MACHINE FOR MOLDING AND PRESSING TILES.
No. 532,500. Patented Jan. 15, 1895.
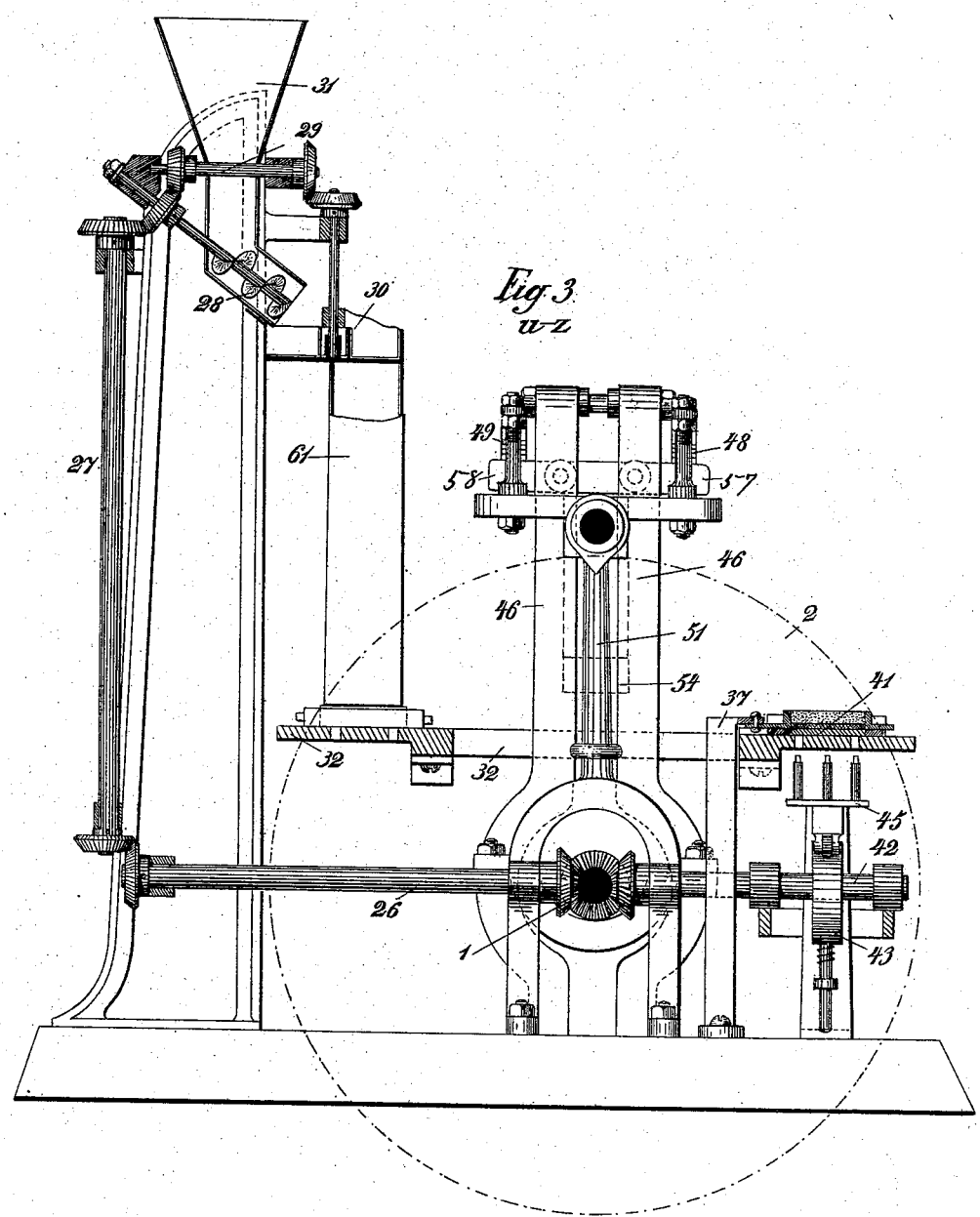
Attest
Walter Donaldson
F. L. Middleton
Inventor
Karl Thomann
by Ellis Spear
Atty.

(Specimens.)
6 Sheets—Sheet 4.
K. THOMANN.
MACHINE FOR MOLDING AND PRESSING TILES.
No. 532,500. Patented Jan. 15, 1895.
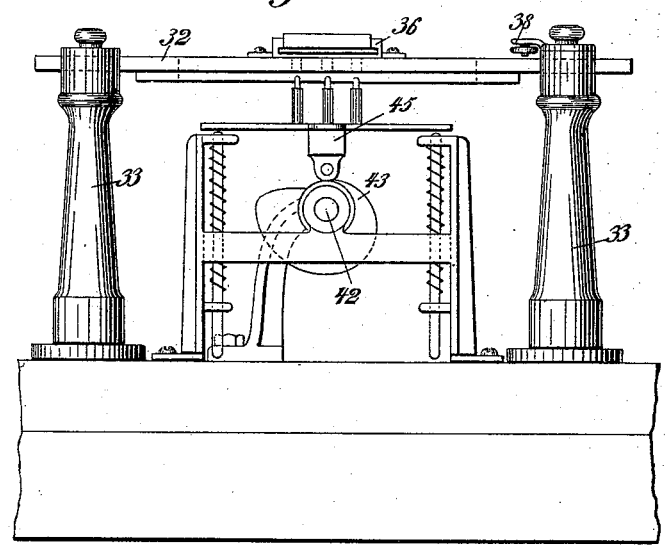
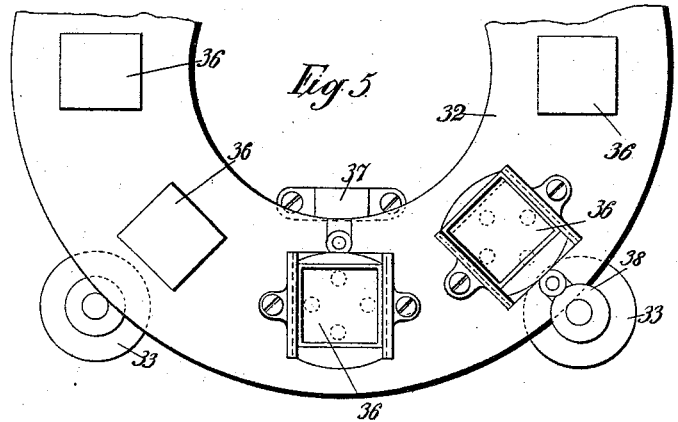
Attest
Walter Donaldson
F. L. Middleton
Inventor
Karl Thomann
by Ellis Spear
Atty.

(Specimens.)
K. THOMANN.
MACHINE FOR MOLDING AND PRESSING TILES.
No. 532,500. Patented Jan. 15, 1895.
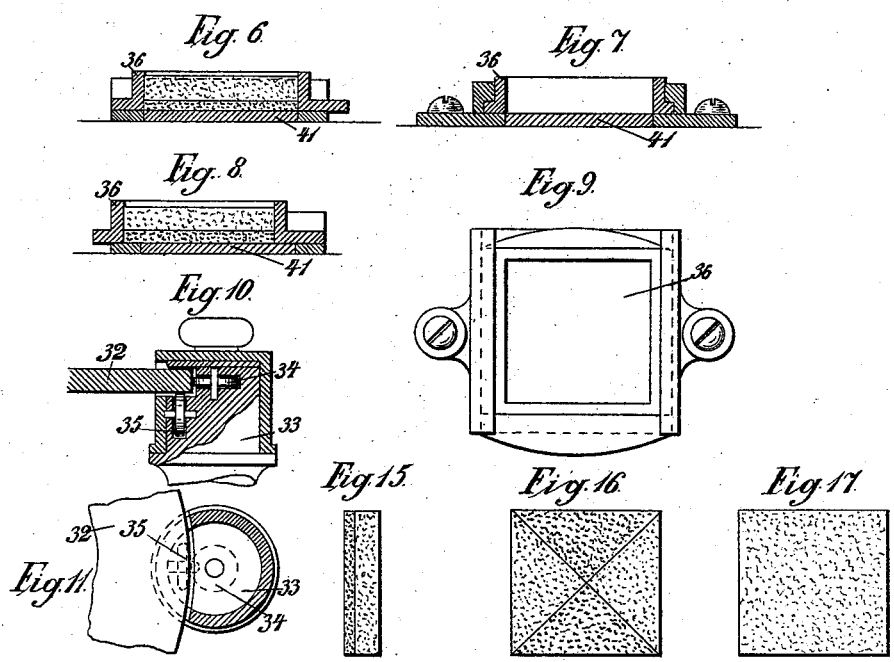
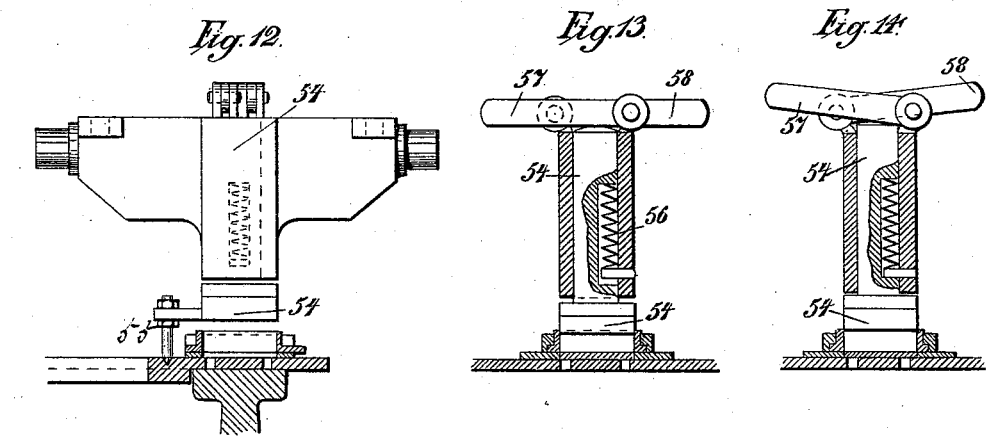

(Specimens.)
6 Sheets—Sheet 6.
K. THOMANN.
MACHINE FOR MOLDING AND PRESSING TILES.
No. 532,500. Patented Jan. 15, 1895.
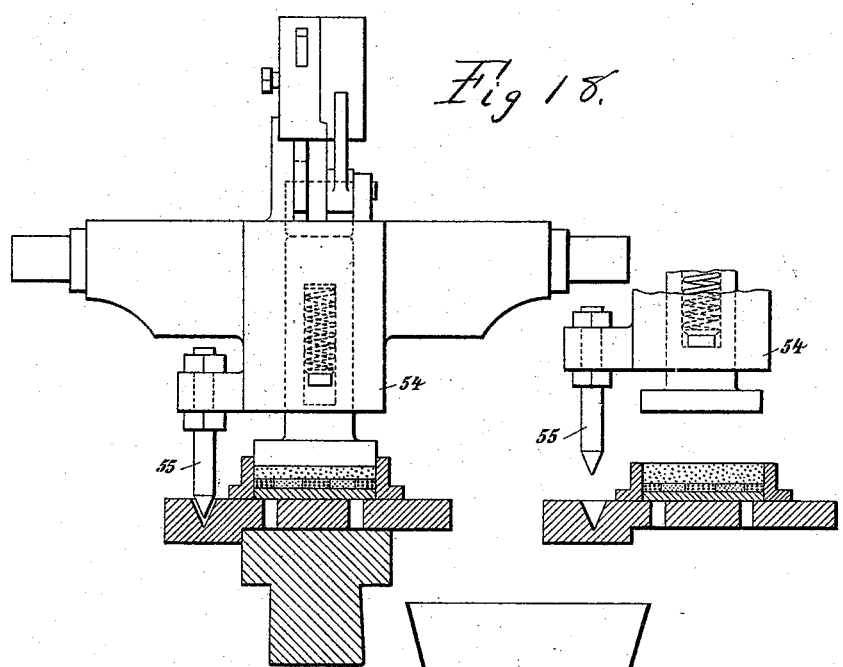
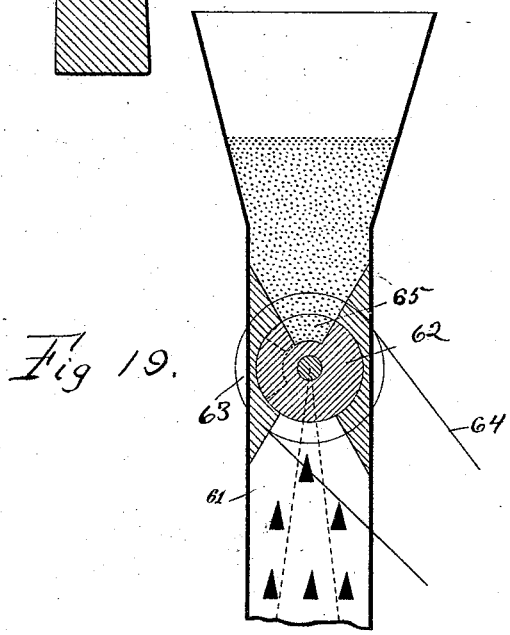
Attest
James M. Spear
Walter Donaldson
Inventor
Karl Thomann
By Ellis Spear
Atty
THE NORRIS PETERS CO., PHOTO-LITHO., WASHINGTON, D. C.

UNITED STATES PATENT OFFICE.

KARL THOMANN, OF HALLE-ON-THE-SAALE, GERMANY.

MACHINE FOR MOLDING AND PRESSING TILES.

SPECIFICATION forming part of Letters Patent No. 532,500, dated January 15, 1895.

Application filed January 5, 1893. Serial No. 457,358. (Specimens.)

*To all whom it may concern:*

Be it known that I, KARL THOMANN, manufacturer, of Halle-on-the-Saale, in the Kingdom of Prussia and German Empire, have invented a new or Improved Machine for Molding and Pressing Tiles or the Like Solid Earthenware Articles, of which the following is a specification, reference being had therein to the accompanying drawings.

The following invention relates to a machine for producing tiles or the like solid earthenware articles and this machine consists of a circular revoluble press table with color and material feeding apparatus arranged over the same; also a press and mold releasing contrivance.

The object of the machine is the automatic coloring, forming, pressing and eventual throwing out of the mold of flooring slabs, building stones, blocks, tiles and the like.

In the accompanying drawings the said invention is represented in its essential parts and is hereinafter particularly described with reference to said drawings and finally pointed out in the claims.

In the drawings hereunto annexed, Figure 1 is a plan of the machine. Fig. 2 is a vertical section on the line 2—2 Fig. 1 looking in the direction of the arrow *y*. Fig 3 is a vertical section on line 3—3 Fig. 1 looking in the direction of the arrow *w*. Fig. 4 is a local sectional elevation on line 4—4 Fig. 1. Fig. 5 is a part plan of the press table with the contrivance for loosening the pressed tiles, &c., in their molds. Figs. 6, 7, 8 and 9 are detail views of the mold boxes. Figs. 10 and 11 are detail views of the supports for the mold table. Figs. 12, 13 and 14 are detail views of the plunger head or stamp, and Figs. 15, 16 and 17 are views of the completed and pressed tile produced. Fig. 18, is a detail view of the adjusting contrivance, and Fig. 19 is a detail of the color feeding device.

The construction of the apparatus is essentially as follows:

The driving shaft 1 has firmly fixed therein the driving wheel 2 and the bevel cog wheel 3. The bearings of the shaft 1 are at 4, 5, 6 and 7 underneath the mold table hereinafter described. The bevel wheel 3 gears into a second bevel tooth wheel 8 carried on the vertical shaft 9 which is mounted in the frame or support 10 and by means of the arrangement of the bevel cog wheels and gearing 11, 12, 20, 13 and 14 rotates the Archimedean screws 15. The screws 15 are situated in the sloping outlets of the circular color funnels 18 and supported on the table 17 by means of bracket 16 fastened in the supporting frame 10. These outlets of the funnels 18 open on the distributing table 19 which is divided into as many compartments as there are color funnels in operation. Through the toothed wheel on the shaft 20 and the small toothed wheels 21 gearing therewith the distributers 22 rotating in the separate compartments of the distribution table 19 are set in motion. From the distribution table 19 the separate distribution pipes or tubes 23 lead into the mold pipe 24. There is further fixed upon the driving shaft 1 the bevel cog wheel 25 which by means of suitable connections 26 and 27 (see Fig. 3) set the Archimedean screw 28 in motion which delivers the material (for forming the tile, &c.) from the hopper 31 to the table 30 and thence to the delivery chute or pipe 61.

32 is the circular molding table which is supported and free to revolve horizontally in the four columns 33 with the anti-friction rollers therein 34 and 35 (see Figs. 10 and 11) and for the sake of clearness I shall hereinafter refer to this table 32 as the "press table." This "press-table" carries the molding boxes or molds 36. (See Figs. 5 to 9.) These molding boxes 36 are divided in two parts of which the under part is solidly connected to the press table. The upper part on the contrary is so arranged as to be movable in the direction of the radius of the press table. 37 and 38 are contrivances by means of which the said movable part of the molding box is moved inward or outward upon passing as the press table rotates.

39 (Fig. 2) is a projecting arm or thumb on shaft 1 which by coming in contact with the tappets or projections 40 turns the press table round by a step by step motion as far as required at each movement.

Fig. 4 shows a contrivance by means of which the ready pressed tile, &c., is mechanically lifted out of the mold 36 on the false bottom or plate 41 and a similar contrivance also operates under the color conducting pipe 24 by means of which raising contrivance the plate 41 is lifted up to pipe 24 so that the color is laid on in sharp outlines.

The contrivance Fig. 4 essentially consists of cams 43 and 44 fixed respectively upon the shaft 42 in the first mentioned case Figs. 3 and 4 (and upon shaft 1 in the second case) which shaft and said cams thereon periodically raise the crown 45 with vertical pins thereon as shown so as to lift the plate 41 in the mold.

The pressing apparatus is as follows:—46 is the guide frame or standard forming guide-ways to the cross beam 47 carrying the springs 48 and 49. The beam 47 is moved up and down by the two eccentric rods 50 and 51 actuated by means of eccentrics 52 and 53 on the shaft 1. In the cross head 47 there is a plunger head or stamp 54 so arranged as to be vertically adjustable and represented in local section in Figs. 12, 13 and 14. 55 (Figs. 2, 12 and 18) is an adjusting contrivance on the head or stamp 54 so as to insure that the latter enters truly into the mold.

Figs. 13 and 14 show a spring arrangement for the head or stamp 54 the object of which is that the latter—after pressure from the cross bar 47 is effected—should be again carried upward.

57 and 58 are levers pivotally connected to opposite sides of the cross head 47 which extend across the same past each other with their free ends located beneath or in contact with the springs 48 and 49.

The upper end of the head or stamp 54 is rounded to provide a suitable bearing face against which the under sides of the levers bear. As the cross head descends until the stamp comes in contact with the mold the tendency of the stamp would be to rise within the cross head into the position shown in Fig. 14, but this tendency would be overcome by the pressure of the springs 48 and 49 upon the outer ends of the levers.

In order that the stamp or head 54 may exercise a varying pressure according to the material under treatment the springs 48 Fig. 1 and 49 are adjustable in slots 59 or other suitable manner toward and from each other.

The bottom half of the press table is supported at the point under the head or stamp 54 by the support 60.

The working of the machine is as follows:— The hopper 18 is filled with various coloring materials, the hopper 31 with mortar, cement, potters' clay or the like, and the shaft 1 put in motion. The pin mounted crown 45 presses the plate 41 against the color conducting tube 24 in which a tubular system corresponding with the ornament desired to be imprinted on the stone is inserted which stands in connection with the tubes 23 in position corresponding to the respective colors. This tubular system comprises a tube 24 divided by internal walls into compartments of any desired shape or configuration which compartments are connected by tubes 23 with the devices for supplying the various colors before referred to. As these different coloring matters pass through their respective tubes 23 and into the compartments of the tube 24 they fall upon the mold plate beneath the compartments covering said plate in different colored sections, corresponding in shape to the compartments of the tube thereby producing the desired pattern. Then the crown 45 sinks and with it the plate 41 and the table, (by the action of the thumb 39 striking one of the arms 40) undergoes a movement of one step, which brings the mold under the conductor 61. As the color layer is at the bottom of the mold, the material to form the body of the tile passes upon it from the conductor 61, and when the mold is filled it passes on to the press where the whole is compressed, thus forming the tile, face down, within the mold. In order to control the flow of the material through the tube 61 a feed device is provided as is shown in Fig. 19 which consists of a drum 62 revolving in a suitable casing and driven by means of pulley 63 and belt 64 from any suitable moving part of the machine. A recessed portion 65 in the drum receives the material and as the drum revolves the material contained within the recess is carried around and discharged into the tube below the drum. When the material in the mold is pressed by the head 54 it next passes (with the press table) the rollers 37 and 38 (Fig. 5) and is thereby loosened from the mold by the shifting (sliding) of the movable part of the latter on the bed of the press table and then finally reaches the throw off apparatus Fig. 4 which lies under the press table at the point marked A Fig. 1. Here the crown or device 45 lifts the plate 41 and with it the ready pressed article thereon upward out of the mold and in such a manner that it can be removed by hand or as desired. The same course of working is accomplished by each molding box on the press and the machine works automatically so that only the introduction of the coloring matters and potters' materials, &c., into their respective hoppers or holders requires to be effected by hand. In order to produce the various ornamental colorings the tube 24 can readily be provided with a pattern tube for conducting the colors corresponding with the desired pattern.

Figs. 16 and 17 show the pressed slabs, tiles or articles produced in and by my hereinbefore described machine.

What I claim, and desire to secure by Letters Patent of the United States, is—

1. A machine for molding and pressing tiles and like solid earthen ware articles comprising a revolving mold table carrying a series of mold boxes, a color feeding contrivance for supplying coloring matter to the mold boxes, to form the ornamental face of the tile and independent hopper, and mechanism for supplying material to the mold boxes upon the coloring matter to form the body of the tile and means for compressing the whole to form the completed tile, substantially as described.

2. In combination with the revolving mold table carrying a series of mold boxes, a color feeding device consisting of a table having compartment spaces kept constantly supplied with coloring matter with means for conducting said colors respectively to form the desired pattern for the face of the tile within the mold boxes, a hopper for feeding the tile material to the mold boxes upon the coloring matter to form the body of the tile and a reciprocating plunger for compressing the whole to form the completed tile, substantially as described.

3. In combination the intermittently revolving mold table, a series of mold boxes mounted thereon having vertically movable bottoms, a color feeding device located above the path of the mold boxes, a lifting device located beneath the color feeding device for lifting the movable bottom into contact with the color feeding device, a feed hopper for supplying material into the mold box in the continued movement thereof, and a plunger for compressing the material to form the tile, substantially as described.

4. In combination with the mold table and means for rotating it step by step, a series of mold boxes comprising each a reciprocating frame with a removable bottom, a color supplying device located above the table, a lifting device for raising the movable bottom of the mold into contact with the color supply, a feed hopper for feeding material to the mold, a reciprocating plunger for compressing the material, rigid arms for engaging the sliding frame for loosening the tile and a lifting device for raising the bottom to deliver the completed tile, substantially as described.

5. In combination with the revolving table, a series of molds carried thereby comprising the guide ways secured to the table and mold boxes sliding in said ways radially of the table and having removable bottoms, substantially as described.

6. In combination with the revolving table having a series of pairs of guide ways thereon, mold boxes having rounded ends sliding in said ways radially of the table, removable bottoms in said boxes, rigid projections extending in line with the rounded ends of the boxes for reciprocating them and a plurality of lifting fingers projecting through corresponding openings in the table for lifting the removable bottom, substantially as described.

7. In combination with the revolving mold table carrying a series of mold boxes, means for feeding material to said boxes, and a compressing device comprising the vertically reciprocating cross head, a stamp having its shank yieldingly supported in said cross head and projecting through the same, levers pivotally connected to opposite sides of the cross head and bearing upon the upper end of the shank, and springs connected to the cross head and bearing upon the outer ends of the levers, substantially as described.

8. In combination with the revolving table carrying a series of molds means for applying pressure thereto, comprising the vertically reciprocating cross head, a stamp having a shank with a rounded upper end yieldingly supported in said cross head, levers pivotally connected to opposite sides of the cross head and bearing upon the rounded upper end of the shank, and leaf springs having their ends connected to the cross head and their central portions bearing upon the free ends of the levers, said springs being adjustable toward and from each other, substantially as described.

In witness whereof I have hereunto set my hand in presence of two witnesses.

KARL THOMANN.

Witnesses:
W. PARKEBUSOH,
CARL BORNGRABER.